United States Patent [19]

Tachikawa et al.

[11] 3,914,215

[45] Oct. 21, 1975

[54] BENZODIAZEPINE DERIVATIVES AND PROCESS FOR PREPARING THE SAME

[75] Inventors: Ryuji Tachikawa; Hiromu Takagi; Toshiharu Kamioka; Tetsuo Miyadera; Mitsunobu Fukunaga; Yoichi Kawano, all of Hiro, Japan

[73] Assignee: Sankyo Company Limited, Japan

[22] Filed: Nov. 14, 1968

[21] Appl. No.: 775,914

[30] Foreign Application Priority Data

Nov. 27, 1967 Japan............................. 42-76005
Nov. 27, 1967 Japan............................. 42-76007
Nov. 27, 1967 Japan............................. 42-76008
July 1, 1968 Japan............................. 43-45722
Aug. 31, 1968 Japan............................. 43-62699
Aug. 31, 1968 Japan............................. 43-62700
Oct. 18, 1968 Japan............................. 43-76012
Oct. 18, 1968 Japan............................. 43-76013

[52] U.S. Cl................. 260/239.3 T; 260/256.4 F; 260/562 B; 260/244 R; 260/562 N; 260/307 R; 260/562 S; 260/309.7; 260/562 R; 260/543 R; 260/543 P; 260/543 H; 424/248; 424/251; 424/272; 424/273

[51] Int. Cl.$^2$............... C07D 487/04; C07D 498/04
[58] Field of Search............. 260/239.3, 265.4, 244, 260/307, 309.7

[56] References Cited
UNITED STATES PATENTS 3,371,085  2/1968  Reeder et al. ................... 260/239.3

Primary Examiner—Henry R. Jiles
Assistant Examiner—Robert T. Bond
Attorney, Agent, or Firm—Toren, McGeady and Stanger

[57] ABSTRACT

Novel 5-phenyl(or substituted phenyl)-2,3,4,5-tetrahydro-1H-1,4-benzodiazepine-2-one derivatives. These novel compounds are characterized by their psychosedative properties, especially they show tranquilizing and antidepressant properties and, thus, they are useful as a minor tranquilizer. Such benzodiazepine base is prepared by reaction of corresponding 2-substituted acylaminobenzophenone derivative with appropriate primary amine derivative.

3 Claims, No Drawings

BENZODIAZEPINE DERIVATIVES AND PROCESS FOR PREPARING THE SAME

This invention relates to novel benzodiazepine compounds, their intermediates and processes for preparing them.

In a more particular aspect of this invention, it relates to novel benzodiazepine compounds having the formula

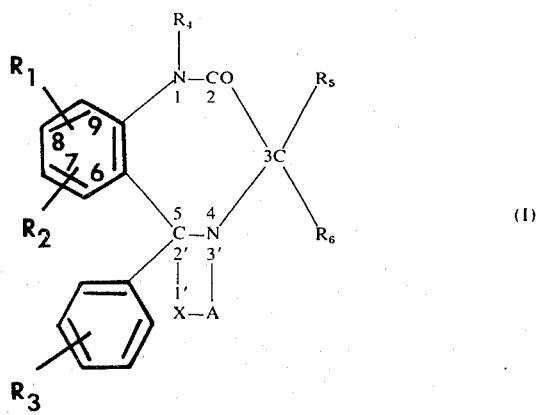

(I)

wherein $R_1$, $R_2$ and $R_3$ may be the same or different and each represents hydrogen atom, a lower alkyl group, a lower alkoxy group, a halogen atom, hydroxy group, nitro group, cyano group, an acyl group, trifluoromethyl group, amino group, an acylamino group, a N-mono(lower alkyl)amino group, a N-di(lower alkyl)amino group, an acyloxy group, carboxyl group, an alkoxycarbonyl group, carbamoyl group, a N-mono(lower alkyl)carbamoyl group, a N-di(lower alkyl)carbamoyl group, a lower alkylthio group, a lower alkylsulfinyl group or a lower alkylsulfonyl group;

$R_4$ represents hydrogen atom, a lower alkyl group, a cycloalkyl group, an aralkyl group, an aryl group or phenacyl group;

$R_5$ and $R_6$ may be the same or different and each represents hydrogen atom or a lower alkyl group;

A represents a polymethylene group which may be substituted with a lower alkyl group, a hydroxy-substituted lower alkyl group or phenyl group; and X represents oxygen atom or sulfur atom.

In the above formula (I), the lower alkyl group can be straight or branched alkyl group, such as methyl, ethyl, n-propyl, isopropyl, n-butyl, sec.-butyl, tert.-butyl and the like. The lower alkoxy group can be, for example, methoxy, ethoxy, propoxy, isopropoxy, butoxy and the like. The halogen atom can be fluorine, chlorine, bromine or iodine. The acyl group can be aliphatic and aromatic acyl group such as formyl, acetyl, propionyl, butyryl, benzoyl, toluoyl, naphthoyl and the like. The acylamino group can be, for example, acetylamino, propionylamino, butyrylamino, benzoylamino, toluylamino, naphthoylamino and the like. The N-mono(lower alkyl)-amino group can be, for example, N-methyl, -ethyl, -propyl or -butylamino group. The N-di(lower alkyl)amino group can be, for example, N-dimethyl, -diethyl, -dipropyl or dibutylamino group. The acyloxy group can be, for example, acetoxy, propionyloxy, butyryloxy, benzoyloxy and the like. The alkoxycarbonyl group can be, for example, methoxycarbonyl, ethoxycarbonyl, propoxycarbonyl, butoxycarbonyl and the like. The N-mono(lower alkoxy)carbamoyl-group can be, for example, N-methyl, -ethyl, -propyl or -butylcarbamoyl. The N-di(lower alkyl)carbamoyl group can be, for example, N-dimethyl, -diethyl, -dipropyl or dibutylcarbamoyl. The lower alkylthio group can be, for example, methylthio, ethylthio, propylthio, butylthio and the like. The lower alkylsulfinyl group can be, for example, methylsulfinyl, ethylsulfinyl, propylsulfinyl, butylsulfinyl and the like. The lower alkylsulfonyl group can be, for example, methylsulfonyl, ethylsulfonyl, propylsulfonyl, butylsulfonyl and the like. The cycloalkyl group can be, for example, cyclopropyl, cyclopentyl, cyclohexyl and the like. The aralkyl group can be, for example, benzyl, phenethyl and the like. The aryl group can be, for example, phenyl, naphthyl and the like. The polymethylene group can be, for example, ethylene, propylene, trimethylene, 1,2-butylene, 1,3-butylene, 2,3-butylene, tetramethylene, 1-hydroxymethylethylene, 1-phenylethylene, 1-phenylmethylethylene and the like.

The 5-phenyl-2,3,4,5-tetrahydro-1H-1,4-benzodiazepin-2-one derivatives of the above formula (I) are all novel compounds unknown in the prior art. They have high psychosedative activity. More particularly, they exert both tranquilizing and antidepressant activities on the central nervous system and produce calmness and relaxation. In addition to such favourable psycholeptic properties, the benzodiazepine compounds of this invention have an extremely low toxicity to man and less tendency to produce side effects. Thus, the benzodiazepine compounds of this invention are useful as a minor tranquilizer in the relief of various psychoneurotic depression.

Accordingly, it is one object of this invention to provide a new class of the benzodiazepine derivatives (I) which are valuable minor tranquilizing drugs.

In another particular aspect of this invention, it relates to novel substituted aminoacetylaminobenzophenone compounds having the formula

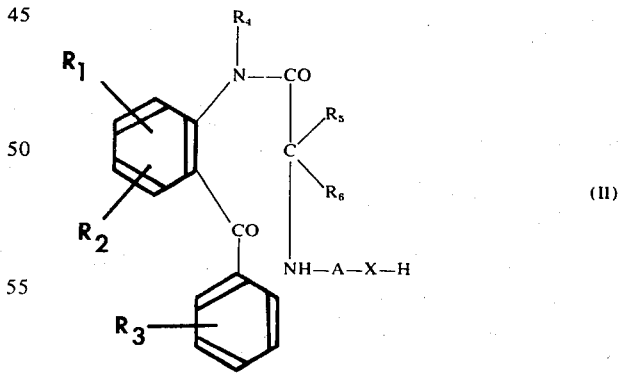

(II)

wherein A, $R_1$, $R_2$, $R_3$, $R_4$, $R_5$, $R_6$ and X are as defined above. The benzophenone compounds of the above formula (II) are also novel compounds. They are useful as intermediate for the synthesis of the aforesaid benzodiazepine compounds (I).

Thus, it is another object of this invention to provide a new class of the benzophenone compounds (II) which have utility as intermediate for the synthesis of valuable psychotropic drugs.

According to still another aspect of this invention, the benzodiazepine compound of the above formula (I) can be prepared by a process which comprises reacting a substituted acetylaminobenzophenone derivative having the formula

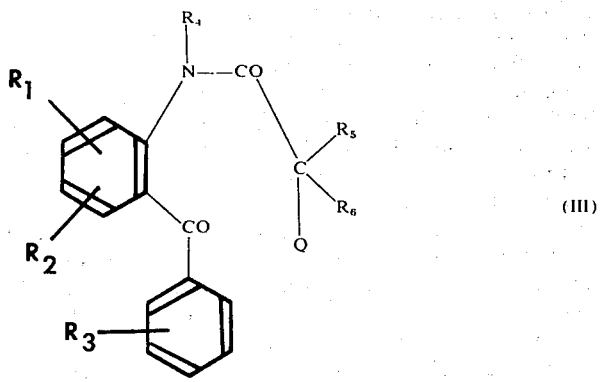

(III)

wherein $R_1$, $R_2$, $R_3$, $R_4$, $R_5$ and $R_6$ are as defined above and Q is an acid radical of a reactive ester with a primary amine derivative having the formula

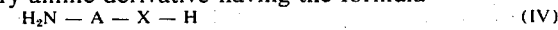

$$H_2N - A - X - H \quad (IV)$$

wherein A and X are as defined above.

In the above formula (III), the group Q, i.e. "an acid radical of a reactive ester" means to include an acid radical of such esters as hydrohalic acid esters, sulfonic acid esters and phosphoric acid esters; representative of such acid radicals being chlorine, bromine, iodine, p-toluenesulfonyloxy group, methanesulfonyloxy group, di-phenylphosphoryl group and the like.

In carrying out the process of this invention for the preparation of the benzodiazepine compound (I) from the benzephenone compound (III), the reaction may be preferably conducted in the presence of an acid binding agent by employing an inert organic solvent as a reaction solvent.

As the reaction solvent, there may be satisfactorily employed any of organic solvents that would not adversely affect the reaction in the process of this invention. Representative examples of these inert organic solvents which may be employed include a lower alkanol such as methanol, ethanol, propanol, isopropanol or butanol; a di-(lower alkyl) ketone such as acetone, methyl ethyl ketone or diethyl ketone; a cyclic ether such as tetrahydrofuran or dioxane; a halogenated hydrocarbon such as chloroform or dichloroethane; an aliphatic carboxylic acid ester such as ethyl acetate; acetonitrile; a di-(lower alkyl) formamide such as dimethylformamide or diethylformamide; and the like. Of the foregoing, most preferable are a lower alkanol such as methanol, ethanol, propanol, isopropanol, butanol and the like and a cyclic ether such as tetrahydrofuran, dioxane and the like.

The reaction in the process of this invention, as is explained hereinabove, may be preferably conducted in the presence of an acid binding agent. As the amine derivative of the above formula (IV) can also act as an acid binding agent, it is not necessarily required for the process of this invention to additionally introduce other acid binding agent into the reaction system. When the amine derivative is employed for the purpose of acting as both a reagent and an acid binding agent, it is not critical, but practically desirable to use said amine derivative in an excess amount by one equivalent or more.

When other acid binding agent is employed in the reaction, representative examples of such acid binding agents include organic and inorganic bases, the organic base being, for example, tertiary amine, e.g. trimethylamine, triethylamine, tri-butylamine, N-methylmorpholine, N-methylpiperidine, N,N'-dimethylpiperazine or dimethylaniline; unsaturated heterocyclic base, e.g. pyridine, picoline or quinoline; and the like and the inorganic base being, for example, basic alkali metal compound such as alkali metal hydroxide, e.g. sodium hydroxide, lithium hydroxide or potassium hydroxide; alkali metal carbonate or bicarbonate, e.g. sodium carbonate, potassium carbonate, sodium bicarbonate or potassium bicarbonate; alkali metal salt of a weak carboxylic acid, e.g. sodium acetate, potassium acetate; and the like. The alkali metal salts of weak carboxylic acid are preferred in the process of this invention.

The reaction temperature in the process of this invention is not critical, but it is found that heating may favourably accelerate the reaction in the process of this invention. It is preferable to conduct the reaction at a temperature of about 50°C. or higher, usually at a reflux temperature of the reaction solvent employed. The reaction period also is not critical and it may be varied, for example, from several minutes to approximately sixty hours, depending upon the kind and type of starting material and reaction solvent employed, the reaction temperature applied and other factors.

After completion of the reaction, the desired product (I) may be easily recovered from the reaction mixture by a conventional means. For instance, the reaction product may be recovered by removal of the reaction solvent by distillation, extraction of the residue with a suitable extraction solvent, e.g. dichloromethane, washing and drying the extracts and subsequent removal of the extraction solvent and, if desired, the crude product thus obtained may be purified by a conventional means, e.g. recrystallization or chromatography technique.

In the reaction of the process of this invention, it is proved that the benzodiazepine compound of the above formula (I) is formed from the starting benzophenone compound of the above formula (III) via the intermediate benzophenone compound of the formula (II), and also that the benzodiazepine compound of the above formula (I) and the intermediate benzophenone compound of the above formula (II) may be formed in situ in various proportions, depending upon the reaction temperature and period employed.

Therefore, the process of this invention may be satisfactorily carried out without isolation of the intermediate (II) as fully explained hereinabove. And, alternatively, especially where a mixture of a major portion of the intermediate (II) with a minor portion of the benzodiazepine compound (I) is formed in situ at a relatively low temperature, below about 50°C., the process may be then carried out stepwise by isolation of the intermediate (II) from the reaction mixture by a conventional means, e.g. fractional crystallization or chromatography and subsequent conversion of the intermediate (II) into the benzodiazepine compound (I) of this invention.

In carrying out the above-mentioned alternative embodiment of this invention, the first step consists of reaction of the starting benzophenone compound (III) with the amine compound (IV) at a temperature below about 50°C. to form the intermediate benzophenone compound (II) or a mixture of said intermediate (II) with the benzodiazepine compound (I) and, if necessary, subsequent separation of the intermediate (II) from the benzodiazepine compound (I). The reaction in this step may be preferably conducted in the presence of an acid binding agent and in an inert organic solvent. The inert organic solvent and acid binding agent which may be employed in this step may be any of those as described hereinabove with regard to the direct production of the benzodiazepine compound (I) without isolation of intermediate (II). The reaction in this step should be conducted at a relatively lower temperature, i.e. below about 50°C. advantageously for a short reaction period in order to obtain a better yield of the intermediate benzophenone compound (II). The reaction period is not critical and may be varied, depending upon the kind and type of starting material, and reaction solvent employed and the reaction temperature applied, but it is preferable to carry out the reaction for from about 10 minutes to about 20 hours. After completion of the reaction, the reaction product may be recovered from the reaction mixture by a conventional means. For instance, the reaction product may be easily recovered and purified by removal of the solvent with distillation, extraction of the residue with a suitable solvent, removal of the extraction solvent with distillation and recrystallization or chromatography of the residue.

The second step in this embodiment consists of convertion of the intermediate benzophenone compound of the above formula (II) to the benzodiazepine compound (I) of this invention through dehydration and ring closure. The reaction in this latter step may be conducted by subjecting the intermediate (II) isolated from the first step to thermal treatment (including heating to an elevated temperature, preferably above about 50°C., e.g. a reflux temperature of the solvent employed, and maintaining at ambient temperature, e.g. room temperature and so on), preferably in the presence of a catalytic amount of an acid. The reaction in this step may be satisfactorily conducted in the presence or absence of an inert organic solvent. As the inert organic solvent which may be employed in this step, there may be mentioned any of those listed hereinabove in the direct production of the benzodiazepine compound (I). Representative examples of the acid which may be employed as a catalyst in this step include mineral acid, e.g. hydrochloric, hydrobromic, suffuric and phosphoric acids; organic acid, e.g. acetic, propionic, citric and tartaric acids; Lewis acid, e.g. boron trifluoride; and the like, acetic acid being most preferable. The reaction period may be varied over a wide range, depending upon the thermal treatment and kind and types of starting material and, if any, reaction solvent employed. Usually, where heating is applied, the reaction period is in the range of about 5 to 30 hours and, where a relatively lower temperature e.g. room temperature is applied, the reaction period is above about 20 hours, preferably for about 100 hours to about 200 hours. After completion of the reaction, the reaction product, the benzodiazepine compound (I) may be readily recovered from the reaction mixture. For instance, the reaction product can be recovered and purified by removal of the solvent with distillation and subsequent recrystallization of the residue from a suitable solvent.

Where the benzodiazepine compound of the above formule (I) wherein the $R_4$ represents hydrogen atom represented by the following formula is obtained according to the process of this invention

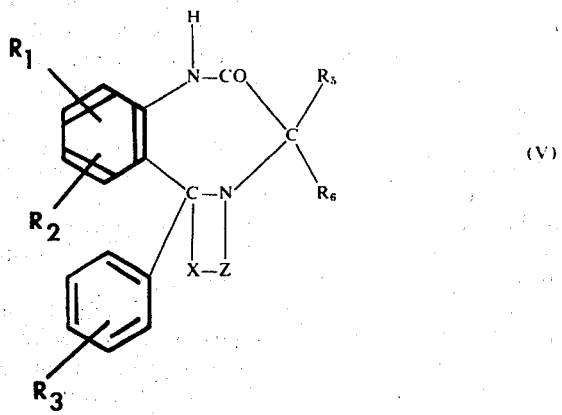

(V)

(wherein A, $R_1$, $R_2$, $R_3$, $R_5$, $R_6$ and X are as defined above), such a benzodiazepine compound (V) may be converted into the benzodiazepine compound of the above formula (I) wherein the $R_4$ represents the above-defined group other than hydrogen atom by converting the former benzodiazepine compound to the corresponding alkali or alkaline earth metal salt thereof and then reacting the salt thus obtained with a compound having the formula $$R_4' - Y \qquad (VI)$$

wherein $R_4'$ represents the above-defined $R_4$ group other than hydrogen atom and Y represents halogen atom or the group $—SO_4—R_4'$ in which $R_4'$ is as defined above.

In carrying out the above-mentioned process in this invention, the reaction may be preferably conducted by mixing an alkali or alkaline earth metal salt such as sodium, potassium, calcium or barium salt, of the benzodiazepine compound of the above formula (V) with a compound of the above formula (VI) in an inert organic solvent.

As the reaction solvent, there may be satisfactorily employed any of organic solvents that would not adversely affect the reaction in the process of this invention. Representative examples of these inert organic solvents which may be employed include a lower alkanol such as methanol, ethanol, propanol, isopropanol or butanol; a di-(lower alkyl) ketone such as acetone, methyl ethyl ketone or diethyl ketone; a cyclic ether such as tetrahydrofuran or dioxane; a halogenated hydrocarbon such as chloroform, carbon tetrachloride or dichloroethane; an aliphatic carboxylic acid ester such as ethyl acetate; acetonitrile; a di-(lower alkyl) formamide such as dimethylformamide or diethylformamide; and the like. Dimethylformamide is preferable. The reaction temperature is not critical, but it is usual and preferable to conduct the reaction at room temperature or higher. However, lower temperatures may be of course applied with success. The reaction period may be usually in the range of about 4 to about 20 hours.

Alternatively, the above conversion in this invention may be effected by reacting the benzodiazepine compound (V) with an alkali or alkaline earth metal, e.g. sodium, potassium, lithium or calcium or a basic alkali or alkaline earth metal compound such as hydride, e.g. sodium hydride, lithium hydride or calcium hydride, hydroxide, e.g. sodium hydroxide, potassium hydroxide or lithium hydroxide or alcoholate, e.g. sodium methylate, sodium ethylate or potassium tert.-butoxide in a suitable organic solvent such as alcohol e.g. methanol or ethanol to form the corresponding salt of the benzodiazepine compound (V) in situ followed by reaction of the salt (without isolation thereof) with the compound (VI).

After completion of the reaction, the reaction product, the benzodiazepine compound (I) may be recovered from the reaction mixture by a conventional method, for example, by removing the solvent, dissolving the residue in a suitable organic solvent, washing, drying, and removing the solvent.

The benzodiazepine compounds of the above formula (I) of this invention are useful as a minor tranquilizer. These active compounds may be employed for the treatment of psychoneurotic disorders in the form of a pharmaceutical preparation which comprises the benzodiazepine compound (I) and a pharmaceutically acceptable carrier. The pharmaceutical preparation may be in the form of oral preparations including tablets, capsules, powders, oral suspensions and syrups, or parenteral preparations including injectable solutions and suspensions. In making up these preparations, there may be employed any of pharmaceutically acceptable carriers commonly used in the art. Examples of such carriers are pharmaceutical vehicle, binder or filler such as water, starch, gelatin, lactose, talc, cellulosic material, magnesium stearate, vegetable oils, gum and any other known material. These pharmaceutical preparations may, if desired, contain various kinds and types of auxiliary agents, such as preserving agents, stabilizing agents, emulsifying agents, buffers or salts for adjusting osmotic pressure and they may be also steritized in a conventional manner.

The amount to be administered for the treatment of psychoneurotic disorders, that is, the dosage of the active benzodiazepine compound (I) should be determined by skilled physicians taking consideration of the ages and weight of patients, kinds and severities of disorders, possible side effects and other factors, but there is usually employed the total daily dosage for adults of about 30 to 60 mg., preferably in multiple doses such as 3 or more times a day, while larger total daily dosages may be effectively employed in some cases. Moreover, the active benzodiazepine compound (I) of this invention may be continuously and satisfactorily administered to man for a long period of time, for example, about 2 to 3 weeks, based upon the severities of disorders.

The following examples are given for the purpose of illustrating of this invention. It is to be understood that these examples should not be construed as limiting the scope of this invention.

Examples 1 to 18 illustrate the preparation of the benzodiazepine compound (I) from the benzophenone compound (III).

Examples 19 to 31 illustrate the preparation of the intermediate benzophenone compound (II) from the benzophenone compound (III).

Examples 32 to 41 illustrate the preparation of the benzodiazepine compound (I) from the intermediate benzophenone compound (II).

Examples 42 to 49 illustrate the preparation of the benzodiazepine compound (I) from the benzodiazepine compound (V).

The process of this invention as set forth hereinabove may be schematically shown as follows:

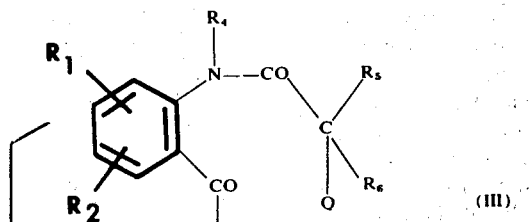

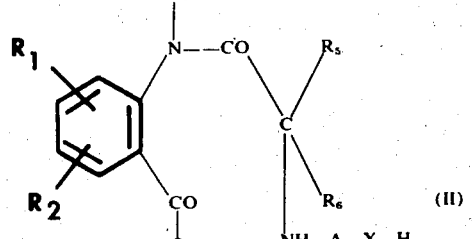

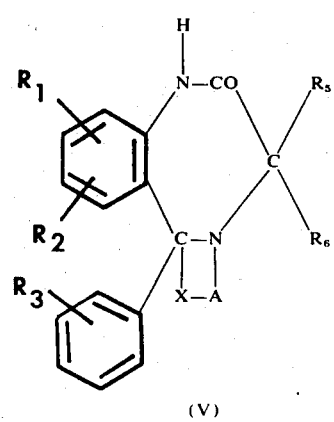

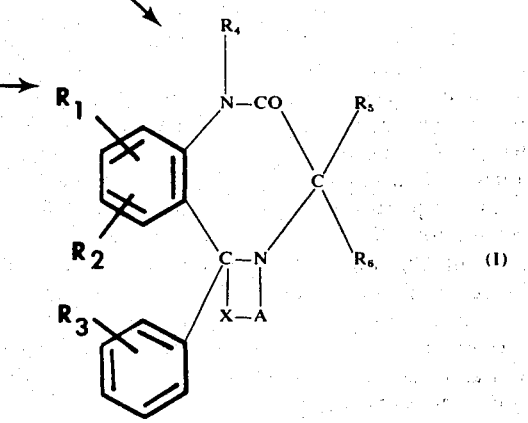

EXAMPLE 1

7-Chloro-5-phenyl-tetrahydrooxazolo[5.4-b]-2,3,4,5-tetrahydro-1H-1,4-benzodiazepin-2-one To a solution of 3,5g. of 5-chloro-2-bromoacetylaminobezophenone in 80ml. of dioxane were added 0.6g. of 2-aminoethanol and 0.85g. of sodium acetate. The resulting mixture was heated under reflux for 14 hours. After completion of the reaction, the solvent was distilled off and the residue was extracted with dichloromethane. The extract was washed with water, dried over anhydrous sodium sulfate and the solvent was distilled off. The residue was recrystallized from ethanol to give 1.9g. of the desired product melting at 175°–176°C.

EXAMPLE 2

7-Chloro-5-phenyl-tetrahydro-2'H-1',3'-oxazino[5.4-b]-2,3,4,5-tetrahydro-1H-1,4-benzodiazepin-2-one A mixture of 4.3g. of 5-chloro-2-bromoacetylaminobenzophenone, 0.9g. of 3-amino-n-propanol, 1.2g. of triethylamine and 80ml. of methanol was heated under reflux for 8 hours. The reaction mixture was treated in the same manner as in the above Example 1 to give 3.4g. of the desired product melting at 220°–223°C.

EXAMPLE 3

7-Chloro-5-phenyl-5'-methyltetrahydrooxazolo[5.4-b]-2,3,4,5-tetrahydro-1H-1,4-benzodiazepin-2-one To a solution of 12.0g. of 5-chloro-2-chloroacetylaminobenzophenone and 3,2g. of isopropanolamine in 100ml. of ethanol was added 3.3g. of sodium acetate. The resulting mixture was heated under reflux with stirring for 12 hours. After completion of the reaction, the reaction mixture was treated in the same manner as in the above Example 1 to give 10.6g. of the desired product melting at 186°–188.5°C.

EXAMPLE 4

7-Chloro-5-(2-chlorophenyl)-tetrahydrooxazolo[5.4-b]-2,3,4,5-tetrahydro-1H-1,4-benzodiazepin-2-one To a solution of 5.8g. of 5-chloro-2-bromoacetylamino-o-chlorobenzophenone in 120ml. of ethanol were added 0.95g. of ethanolamine and 1.3g of sodium acetate.

The resulting mixture was heated under reflux for 16 hours. After completion of the reaction, the reaction mixture was treated in the same manner as in the above Example 1 to give 3.25g. of the desired product melting at 202°–204°C. with decomposition.

EXAMPLE 5

7-Chloro-5-phenyl-tetrahydrothiazolo[5.4-b]-2,3,4,5-tetrahydro-1H-1,4-benzodiazepin-2-one To a solution of 2.1g. of 5-chloro-2-bromoacetylaminobenzophenone and 0.5g. of 2-mercaptoethylamine hydrochloride in 60ml. of ethanol was added 4.9g of sodium acetate. The resulting mixture was heated under reflux for 14 hours. After completion of the reaction, the reaction mixture was treated in the same manner as in the above Example 1 to give 1.3g. of the desired product melting at 241°–243°C.

EXAMPLE 6

7-Nitro-5-phenyl-5'-methyltetrahydrooxazolo[5.4-b]-2,3,4,5-tetrahydro-1H-1,4-benzodiazepin-2-one To a solution of 3.6g. of 5-nitro-2-bromoacetylaminobenzophenone in 80ml. of ethanol were added 0.8g. of isopropanolamine and 0.9g. of sodium acetate. The resulting mixture was heated under reflux for 16 hours. After completion of the reaction, the reaction mixture was treated in the same manner as in the above Example 1 to give 2.9g. of the desired product melting at 209°C.

EXAMPLE 7

7,9-Dimethyl-5-phenyl-5'-methyltetrahydrooxazolo[5.4-b]-2,3,4,5-tetrahydro-1H-1,4-benzodiazepin-2-one To a solution of 3.4g. of 3,5-dimethyl-2-bromoacetylaminobenzophenone in 100ml. of ethanol were added 1.8g. of isopropanolamine and 2.0g. of sodium acetate. The resulting mixture was heated under reflux for 16 hours. After completion of the reaction, the reaction mixture was treated in the same manner as in the above Example 1 to give 2.8g. of the desired product melting at 273°C.

EXAMPLE 8

7-Chloro-5-(2-chlorophenyl)-5'-methyltetrahydrooxazolo-[5.4-b]-2,3,4,5-tetrahydro-1H-1,4-benzodiazepin-2-one To a solution of 3.9g. of 5-chloro-2-bromoacetylamino-o-chlorobenzophenone in 100ml. of ethanol were added 0.8g. of isopropanolamine and 1.0g. of sodium acetate. The resulting mixture was heated under reflux for 14 hours. After completion of the reaction, the reaction mixture was treated in the same manner as in the above Example 1 to give 2.08g. of the desired product melting at 190°–192°C. with decomposition.

Following the substantially same procedure as described above, there were similarly prepared the following benzodiazepine derivatives:

7-chloro-5-(2-fluorophenyl)tetrahydrooxazolo[5.4-b]-2,3,4,5-tetrahydro-1H-1,4-benzodiazepin-2-one (m.p. 181°–183°C.);

7-chloro-5-(2-fluorophenyl)-5'-methyltetrahydrooxazolo[5.4-b]-2,3,4,5-tetrahydro-1H-1,4-benzodiazepin-2-one (m.p. 197°–199°C. with decomposition);

7-bromo-5-phenyl-5'-methyltetrahydrooxazolo[5.4-b]-2,3,4,5-tetrahydro-1H-1,4-benzodiazepin-2-one (m.p. 181°–183°C.);

7-bromo-5-phenyl-tetrahydrooxazolo[5.4-b]-2,3,4,5-tetrahydro-1H-1,4-benzodiazepin-2-one (m.p. 189.5°–191.5°C.);

7-nitro-5-phenyl-tetrahydrooxazolo[5.4-b]-2,3,4,5-tetrahydro-1H-1,4-benzodiazepin-2-one (m.p. 218°–221°C.);

7-bromo-5-(2-chlorophenyl)-tetrahydrooxazolo[5.4-b]-2,3,4,5-tetrahydro-1H-1,4-benzodiazepin-2-one (m.p. 205°–207°C. with decomposition); and 7-bromo-5-(2-chlorophenyl)-5'-methyltetrahydrooxazolo[5.4-b]-2,3,4,5-tetrahydro-1H-1,4-benzodiazepin-2-one (m.p. 196°–198°C. with decomposition).

EXAMPLE 9

7-Chloro-5-phenyl-tetrahydrooxazolo[5.4-b]-2,3,4,5-tetrahydro-1H-1,4-benzodiazepin-2-one To a solution of 3.5g of 5-chloro-2-bromoacetylaminobenzophenone in 80ml. of dioxane were added 0.6g. of 2-aminoethanol and 0.85g. of sodium acetate. The resulting mixture was stirred at room temperature for 100 hours. After completion of the reaction, the solvent was distilled off and the residue was extracted with dichloromethane. The extract was washed with water, dried over anhydrous sodium sulfate and the solvent was distilled off. The residue was recrystallized from ethanol to give the desired product melting at 175°–176°C.

EXAMPLE 10

7-Chloro-5-phenyl-tetrahydro-2'H-1',3'-oxazino[5.4-b]-2,3,4,5-tetrahydro-1H-1,4-benzodiazepin-2-one A mixture of 4.3g. of 5-chloro-2-bromoacetylaminobenzophenone, 0.9g. of 3-amino-n-propanol and 1.2g. of treithylamine in 80ml. of methanol was stirred at room temperature for 150 hours. After completion of the reaction, the solvent was distilled off and the residue was extracted with dichloromethane. The extract was washed with water, dried over anhydrous sodium sulfate and then the solvent was distilled off. The residue was recrystallized from ethanol to give crystals of the desired product melting at 220°–223°C.

EXAMPLE 11

7-Chloro-5-phenyl-5'-methyltetrahydrooxazolo[5.4-b]-2,3,4,5-tetrahydro-1H-1,4-benzodiazepin-2-one To a solution of 12.0g. of 5-chloro-2-chloroacetylaminobenzophenone and 3.2g. of isopropanolamine in 100ml. of ethanol was added 3.3g. of sodium acetate. The resulting mixture was stirred at room temperature for 140 hours. After completion of the reaction, the reaction mixture was treated in the same manner as in the above Example 10 to give the desired product melting at 186°–188.5°C.

Following the substantially same procedure as described above, there were similarly prepared the following benzodiazepine derivatives:

7-chloro-5-phenyl-tetrahydrothiazolo[5.4-b]-2,3,4,5-tetrahydro-1H-1,4-benzodiazepin-2-one (m.p. 241°–243°C.);

7-nitro-5-phenyl-5'-methyltetrahydrooxazolo[5.4-b]-2,3,4,5-tetrahydro-1H-1,4-benzodiazepin-2-one (m.p. 209°C.);

7,9-dimethyl-5-phenyl-5'-methyltetrahydrooxazolo[5.4-b]-2,3,4,5-tetrahydro-1H-1,4-benzodiazepin-2-one (m.p.273°C.);

7-chloro-5-(2-chlorophenyl)-5'-methyltetrahydrooxazolo-[5.4-b]-2,3,4,5-tetrahydro-1H-1,4-benzodiazepin-2-one (m.p. 190°–192°C., with decomposition);

7-chloro-5-(2-chlorophenyl)-tetrahydrooxazolo[5.4-b]-2,3,4,5-tetrahydro-1H-1,4-benzodiazepin-2-one (m.p. 202°–204°C. with decomposition);

7-chloro-5-(2-fluorophenyl)-tetrahydrooxazolo[5.4-b]-2,3,4,5-tetrahydro-1H-1,4-benzodiazepin-2-one (m.p. 181°–183°C.);

7-chloro-5-(2-fluorophenyl)-5'-methyltetrahydrooxazolo[5.4-b]-2,3,4,5-tetrahydro-1H-1,4-benzodiazepin-2-one (m.p. 197°–199°C., with decomposition);

7-bromo-5-phenyl-5'-methyltetrahydrooxazolo[5.4-b]-2,3,4,5-tetrahydro-1H-1,4-benzodiazepin-2-one (m.p. 181°–183°C.);

7-bromo-5-phenyl-tetrahydrooxazolo[5.4-b]-2,3,4,5-1H-1,4-benzodiazepin-2-one (m.p. 189.5°–191.5°C.);

7-nitro-5-phenyl-tetrahydrooxazolo[5.4-b]-2,3,4,5-tetrahydro-1H-1,4-benzodiazepin-2-one (m.p. 218°–221°C.);

7-bromo-5-(2-chlorophenyl)-tetrahydrooxazolo[5.4-b]-2,3,4,5-tetrahydro-1H-1,4-benzodiazepin-2-one (m.p. 205°–207°C., with decomposition); and 7-bromo-5-(2-chlorophenyl)-5'-methyltetrahydro[5.4-b]-2,3,4,5-tetrahydro-1H-1,4-benzodiazepin-2-one (m.p. 196°–198°C., with decomposition).

EXAMPLE 12

7-Chloro-3-methyl-5-phenyl-5'-methyltetrahydrooxazolo[5.4-b]-2,3,4,5-tetrahydro-1H-1,4-benzodiazepin-2-one To a solution of 7.3g. of 5-chloro-2-(α-bromopropionyl)-aminobenzophenone in 100ml. of ethanol were added 1.6g. of isopropanolamine and 1.7g. of sodium acetate. The resulting mixture was heated under reflux with stirring for 12 hours. After completion of the reaction, the solvent was distilled off under reduced pressure from the reaction mixture and the residue was extracted with dichloromethane. The extract was washed with water, dried over anhydrous sodium sulfate and then the solvent was distilled off. The residue was recrystallized from ethanol to give the desired product melting at 216°–217°C.

Following the substantially same procedure as described above, there were similarly prepared the following benzodiazepine derivatives:

3,7,9-trimethyl-5-phenyl-tetranydrooxazolo[5.4-b]-2,3,4,5-tetrahydro-1H-1,4-benzodiazepin-2-one (m.p. 219°–221°C.);

7-bromo-3-methyl-5-phenyl-tetrahydrooxazolo[5.4-b]-2,3,4,5-tetrahydro-1H-1,4-benzodiazepin-2-one (m.p. 198°–201°C.);

7-chloro-3-methyl-5-phenyl-tetrahydrooxazolo[5.4-b]-2,3,4,5-tetrahydro-1H-1,4-benzodiazepin-2-one (m.p. 205°–207°C.);

7-chloro-3-ethyl-5-phenyl-tetrahydrooxazolo-[5.4-b]-2,3,4,5-tetrahydro-1H-1,4-benzidiazepin-2-one (m.p. 183°–184°C.); and 7-chloro-5-(4-chlorophenyl)-3-methyl-tetrahydrooxazolo[5.4-b]-2,3,4,5-tetrahydro-1H-1,4-benzodiazepin-2-one (m.p, 204°–205.5°C.).

EXAMPLE 13

7-Chloro-3-methyl-5-phenyl-tetrahydro-2'H-1',3'-oxazino[5.4-b]-2,3,4,5-tetrahydro-1H-1,4-benzodiazepin-2-one To a solution of 3.6g. of 5-chloro-2-(α-bromopropionyl) aminobenzophenone in 80ml. of ethanol were added 0.8g. of 3-amino-n-propanol and 0.9g. of sodium acetate. The resulting mixture was heated under reflux with stirring for 16 hours. After completion of the reaction, the solvent was distilled off and the residue was dissolved in dichloromethane. The solution was washed with water, dried over anhydrous sodium sulfate and the solvent was distilled off. The residue dissolved in benzene was absorbed on a silica gel column. After elution with benzene of said column, elution was done with a mixture of benzene and ethyl acetate (9:1), the fractions with said mixture was collected and the solvent was distilled off. The residue was recrystallized from ethanol to give 0.6g of the desired product melting at 172.5°–176°C.

Following the substantially same procedure as described above, there were similarly prepared the following benzodiazepine derivatives:

7-nitro-3-methyl-5-phenyl-tetrahydrooxazolo[5.4-b]-2,3,4,5-tetrahydro-1H-1,4-benzodiazepin-2-one (m.p. 221°–225°C. with decomposition);

7-chloro-3-n-propyl-5-phenyl-5'-methyltetrahydrooxazolo-[5.4-b]-2,3,4,5-tetrahydro-1H-1,4-benzodiazepin-2-one (m.p. 178°–181.5°C.);

7-chloro-3-ethyl-9-methyl-5-5'-methyltetrahydrooxazolo[5.4-b]-2,3,4,5-tetrahydro-1H-1,4-benzodiazepin-2-one (m.p. 231°–235°C.);

7-chloro-3,3-dimethyl-5-phenyl-tetrahydrooxazolo[5.4-b]-2,3,4,5-tetrahydro-1H-1,4-benzodiazepin-2-one (m.p. 151°–154.5°C.);

7-chloro-3-methyl-5-(4-nitrophenyl)-tetrahydrooxazolo-[5.4-b]-2,3,4,5-tetrahydro-1H-1,4-benzodiazepin-2-one (m.p. 203°–206°C. with decomposition);

7-chloro-3-methyl-5-(2-methylphenyl)-tetrahydrooxazolo[5.4-b]-2,3,4,5-tetrahydro-1H-1,4-benzodiazepin-2-one (m.p. 213°–217°C. with decomposition); and 7-chloro-3-methyl-5-phenyl-tetrahydrothiazolo[5.4-b]-2,3,4,5-tetrahydro-1H-1,4-benzodiazepin-2-one (m.p. 205°–207°C.).

EXAMPLE 14

7-Chloro-5-phenyl-tetrahydrooxazolo[5.4-b]-2,3,4,5-tetrahydro-1H-1,4-benzodiazepin-2-one To a solution of 3.5g. of 5-chloro-2-tosyloxyacetylaminobenzophenone in 80ml. of ethanol were added 0.6g. of ethanolamine and 0.8g. of sodium acetate. The resulting mixture was heated under reflux for 14 hours. After completion of the reaction, the solvent was distilled off and the residue was dissolved in dichloromethane. The solution was washed with water, dried over anhydrous sodium sulfate and the solvent was distilled off. The residue was then recrystallized from ethanol to give 1.4g. of the desired product as crystals melting at 175°–176.5°C.

EXAMPLE 15

7-Chloro-5-phenyl-5'-methyltetrahydrooxazolo[5.4-b]-2,3,4,5-tetrahydro-1H-1,4-benzodiazepin-2-one To a solution of 7.9g. of 5-chloro-2-tosyloxyacetylaminobenzophenone in 120ml. of methanol were added 1.5g. of isopropanolamine and 1.65g. of sodium acetate. The resulting mixture was heated under reflux with stirring for 18 hours. After completion of the reaction, the reaction mixture was treated in the same manner as in the above Example 14 to give 3.7g. of the desired product as crystals melting at 186°–188°C.

Following the substantially same procedure as described above, the following benzodiazepine derivatives were similarly prepared from the corresponding benzophenones and amines:

7-chloro-5-phenyl-tetrahydro-2'H-1',3'-oxazino[5.4-b]-2,3,4,5-tetrahydro-1H-1,4-benzodiazepin-2-one (m.p. 220.5°–223°C.);

7-nitro-5-phenyl-5'-methyltetrahydrooxazolo[5.4-b]-2,3,4,5-tetrahydro-1H-1,4-benzodiazepin-2-one (m.p. 208°–209°C.);

7,9-dimethyl-5-phenyl-5'-methyltetrahydrooxazolo[5.4-b]-2,3,4,5-tetrahydro-1H-1,4-benzodiazepin-2-one (m.p. 271°–273.5°C.);

7-nitro-5-phenyl-tetrahydrooxazolo[5.4-b]-2,3,4,5-tetrahydro-1H-1,4-benzodiazepin-2-one (m.p. 217°–221°C. with decomposition);

7-bromo-5-phenyl-5'-methyltetrahydrooxazolo [5.4-b]-2,3,4,5-tetrahydro-1H-1,4-benzodiazepin-2-one (m.p. 180°–182°C.);

7-bromo-5-phenyl-tetrahydrooxazolo [5.4-b]-2,3,4,5-tetrahydro-1H-1,4-benzodiazepin-2-one (m.p. 189°–191°C.);

7-chloro-9-methyl-5-phenyl-5'-methyltetrahydrooxazolo-[5.4-b]-2,3,4,5-tetrahydro-1H-1,4-benzodiazepin-2-one (m.p. 252°–253°C.);

7,8-dichloro-5-phenyl-5'-methyltetrahydrooxazolo-[5.4-b]-2,3,4,5-tetrahydro-1H-1,4-benzodiazepin-2-one (m.p. 196°–197.5°C.);

7,9-dichloro-5-phenyl-5'-methyltetrahydrooxazolo-[5.4-b]-2,3,4,5-tetrahydro-1H-1,4-benzodiazepin-2-one (m.p. 226°–228°C.);

7-chloro-1-methyl-5-phenyl-tetrahydrooxazolo[5.4-b]-2,3,4,5-tetrahydro-1H-1,4-benzodiazepin-2-one (m.p. 181°–183°C.);

7-nitro-1-methyl-5-phenyl-5'-methyltetrahydrooxazolo-[5.4-b]-2,3,4,5-tetrahydro-1H-1,4-benzodiazepin-2-one (m.p. 156.5°–158.5°C.);

7-chloro-1-ethyl-5-phenyl-5'-methyltetrahydro[5.4-b]-2,3,4,5-tetrahydro-1H-1,4-benzodiazepin-2-one (m.p. 158°–160°C.);

7-chloro-1-methyl-5-(2-chlorophenyl)-tetrahydrooxazolo-[5.4-b]-2,3,4,5-tetrahydro-1H-1,4-benzodiazepin-2-one (m.p. 155°–158°C.);

7-chloro-5-(2-chlorophenyl)-5'-methyltetrahydrooxazolo-[5.4-b]-2,3,4,5-tetrahydro-1H-1,4-benzodiazepin-2-one (m.p. 190°–192°C., with decomposition);

7-chloro-5-(2-chlorophenyl)-tetrahydrooxazolo[5.4-b]-2,3,4,5-tetrahydro-1H-1,4-benzodiazepin-2-one (m.p. 201°–204°C., with decomposition);

7-chloro-5-(4-nitrophenyl)-5'-methyltetrahydrooxazolo[5.4-b]-2,3,4,5-tetrahydro-1H-1,4-benzodiazepin-2-one (m.p. 193°–195°C.);

7-chloro-5-(2-methylphenyl)-5'-methyltetrahydrooxazolo-[5.4-b]-2,3,4,5-tetrahydro-1H-1,4-benzodiazepin-2-one (m.p. 203°–205°C., with decomposition);

7-chloro-5-(2-fluorophenyl)-5'-methyltetrahydrooxazolo-[5.4-b]-2,3,4,5-tetrahydro-1H-1,4-benzodiazepin-2-one (m.p. 197°–199°C., with decomposition);

7-chloro-5-(2-fluorophenyl)-tetrahydrooxazolo[5.4-b]-2,3,4,5-tetrahydro-1H-1,4-benzodiazepin-2-one (m.p. 181°–183°C.);

7-bromo-5-(2-chlorophenyl)-tetrahydrooxazolo[5.4-b]-2,3,4,5-tetrahydro-1H-1,4-benzodiazepin- 2-one (m.p. 204.5°–207°C. with decomposition);

7-bromo-5-(2-chlorophenyl)-5'-methyltetrahydrooxazolo- [5.4-b]-2,3,4,5-tetrahydro-1H-1,4-benzodiazepin-2-one (m.p. 196°–198°C. with decomposition);

7-chloro-3-methyl-5-phenyl-5'-methyltetrahydrooxazolo- [5.4-b]-2,3,4,5-tetrahydro-1H-1,4-benzodiazepin-2-one (m.p. 216°–217°C.);

7-bromo-3-methyl-5-phenyl-tetrahydrooxazolo[5.4-b]- 2,3,4,5-tetrahydro-1H-1,4-benzodiazepin-2-one (m.p. 198°–201°C.);

3,7,9-trimethyl-5-phenyl-tetrahydrooxazolo[5.4-b]-2,3,4,5-tetrahydro-1H-1,4-benzodiazepin-2-one (m.p. 218°–221°C.); and 7-chloro-3-ethyl-5-phenyl-tetrahydrooxazolo[5.4-b]-2,3,4,5-tetrahydro-1H-1,4-benzodiazepin-2-one (m.p. 183°–184°C.).

EXAMPLE 16

7-Chloro-5-phenyl-tetrahydrothiazolo[5.4-b]-2,3,4,5-tetrahydro-1H-1,4-benzodiazepin-2-one To a solution of 5.7g. of 5-chloro-2-tosyloxyacetylaminobenzophenone in 150ml. of ethanol were added 1.63g. of 2-mercaptoethylamine hydrochloride and 2.4g. of sodium acetate. The resulting mixture was heated under reflux with stirring for 20 hours. After completion of the reaction, the solvent was distilled off from the reaction mixture and the residue was extracted with dichloromethane. The extract was washed with water, dried over anhydrous sodium sulfate and then the solvent was distilled off. The residue dissolved in benzene was absorbed on a silica gel column. After elution with benzene, said column was eluated with a mixture of benzene and ethyl acetate (9 : 1), the fractions with said mixture was collected and the solvent was distilled off. The residue was recrystallized from ethanol to give 2.08g. of the desired product as crystals melting at 241°–243°C.

EXAMPLE 17

7-Chloro-1-methyl-5-phenyl-tetrahydrooxazolo[5.4-b]-2,3,4,5- tetrahydro-1H-1,4-benzodiazepin-2-one To a solution of 4g. of 5-chloro-2bromoacetylmethylaminobenzophenone in 60ml. of tetrahydrofuran was added 1.5g. of ethanolamine. The resulting mixture was stirred at room temperature for 4 hours. After completion of the reaction, the solvent was distilled off from the reaction mixture and the residue was dissolved in dichloromethane. The resulting solution was washed with ether and dried over anhydrous sodium sulfate. After removal of the solvent by distillation, the viscous residue was dissolved in 100 ml. of ethanol. To the ethanolic solution was added several drops of acetic acid and then the resulting mixture was heated under reflux for 12 hours. The reaction mixture was concentrated and then cooled to separate crystalline substance, which was then recovered by filtration to give 2.6g. of the desired product melting at 181°–183°C.

EXAMPLE 18

7-Chloro-1-methyl-5-phenyl-5'-methyltetrahydrooxazolo[5.4-b]-2,3,4,5-tetrahydro-1H-1,4-benzodiazepin-2-one To a solution of 3.3g. of 5-chloro-2-bromoacetylmethylaminobenzophenone in 40ml. of dichloromethane was added 1.5g. of isopropanolamine. The resulting mixture was stirred at room temperature for 10 hours. After completion of the reaction, the reaction mixture was washed with water, dried over anydrous sodium sulfate and then solvent was distilled off. The viscous residue dissolved in 100ml. of ethanol was heated under reflux for 16 hours together with several drops of acetic acid. The reaction mixture was then concentrated and cooled to separate crystalline substance, which was then recovered by filtration to give 1.9g. of the desired product melting at 143°–146°C.

Following the substantially same procedure as described above, there were similarly prepared the following benzodiazepine derivatives:

1,7,9-trimethyl-5-phenyl-5'-methyltetrahydrooxazolo- [5.4-b]-2,3,4,5-tetrahydro-1H-1,4-benzodiazepin-2- on (m.p. 135.5°–138°C.);

1,9-dimethyl-7-chloro-5-phenyl-5'-methyltetrahydrooxazolo [5.4-b]-2,3,4,5-tertahydro-1H-1,4-benzodiazepin- 2-one (m.p. 161.5°–163°C.);

7-nitro-1-methyl-5-phenyl-5'-methyltetrahydrooxazolo- [5.4-b]-2,3,4,5-tetrahydro-1H-1,4-benzodiazepin-2-one (m.p. 156.5°–159°C.);

7-chloro-1-methyl-5-phenyl-tetrahydrothiazolo-[5.4-b]- 2,3,4,5-tetrahydro-1H-1,4-benzodiazepin-2-one (m.p. 218°–219°C.);

7-chloro-1-methyl-5-(4-chlorophenyl)-5'-methyltetrahydrooxazolo [5.4-b]-2,3,4,5-tetrahydro-1H-1,4-benzodiazepin- 2-one (m.p. 164°–167°C.);

7-chloro-1-methyl-5phenyl-tetrahydro-2'H-1',3'-oxazino- [5.4-b]-2,3,4,5-tetrahydro-1H-1,4-benzodiazepin-2-one (m.p. 171.5°–173°C.);

7-bromo-1-methyl-5-phenyl-tetrahydrooxazolo[5.4-b]-1H- 1,4-benzodiazepin-2-one (m.p. 179°–182°C.);

7-chloro-1-ethyl-5-phenyl-5'-methyltetrahydrooxazolo- [5.4-b]-2,3,4,5-tetrahydro-1H-1,4-benzodiazepin-2-one (m.p. 157.5°–160°C.); and 7-chloro-1-benzyl-5-phenyl-5'-methyltetrahydrooxazolo- [5.4-b]-2,3,4,5-tetrahydro-1H-1,4-benzodiazepin-2-one (m.p. 154°–157°C.)

EXAMPLE 19

5-Chloro-2-(2-hydroxyethylamino)acetylaminobenzophenone

A mixture of 3.5g. of 5-chloro-2-chloroacetylaminobenzophenone, 0.7g. of 2-aminoethanol, 1.4g. of triethylamine and 60ml. of tetrahydrofuran was stirred at ordinary temperature for 5 hours. After completion of the reaction, the solvent was distilled off under reduced pressure and the residue was extracted with dichloromethane. The extract was washed with water, dried over anhydrous sodium sulfate and then the solvent was distilled off. The residue was recrystallized from ethanol to give 3.15g. of the desired product melting at 121°–122°C.

EXAMPLE 20

5-Chloro-2-(3-hydroxy-n-propylamino)acetylaminobenzophenone

A mixture of 7.1g. of 5-chloro-2-bromoacetylaminobenzophenone, 1.5g. of 3-amino-n-propanol, 2.0g. of pyridine and 80ml. of ethanol was stirred at ordinary temperature for 12 hours. After completion of the reaction, the ethanol was distilled off under reduced pressure. The residue was extracted with dichloromethane. The extract was washed with water dried over anhydrous sodium sulfate. The solvent was distilled off from the extract. The oily residue dissolved in benzene was chromatographed through a silica gel column. Pale yellow fractions of eluates were collected and the solvent was distilled off therefrom to give 5.2g. of the desired product as a pale yellow oil.

Analysis: Calculated for $C_{18}H_{19}O_3N_2Cl$: C,62.36; H,5.52; N,8.12; Cl,10.22. Found: C,61.98; H,5.38; N,8.24; Cl,10.31.

EXAMPLE 21

5-Chloro-2-(2-hydroxy-1,1-dimethylethylamino)acetylaminobenzo- phenone

A mixture of 3.5g. of 5-chloro-2-bromoacetylaminobenzophenone, 0.9g. of 2-amino-2-2-dimethylethanol, 1.2g. of triethylamine and 100ml. of methanol was stirred at ordinary temperature for 10 hours. After completion of the reaction, the reaction mixture was treated in the same manner as in the above Example 19. to give 2.8g. of the desired product melting at 113°–114°C.

EXAMPLE 22

5-Chloro-2-(2-hydroxy-1-methyl-1-hydroxymethylethylamino)- acetylaminobenzophenone A mixture of 3.5g. of 5-chloro-2-bromoacetylaminobenzophenone, 1.2g. of 1-methyl-1,1-dihydroxymethylethylamine, 1.2g. of triethylamine and 80ml. of dioxane was stirred at ordinary temperature for b 4fours. After completion of the reaction, the reaction mixture was treated in the same manner as in the above Example 19. to give 3.1g. of the desired product melting at 120°–121°C.

EXAMPLE 23

5-Chloro-2-(2-hydroxy-2-methylethylamino)acetylaminobenzophenone

A mixture of 6.0g. of 5-chloro-2-chloroacetylaminobenzophenone 6.0g., 1.6g. of isopropanolamine, 2.5g. of sodium acetate and 120ml. of ethanol was stirred at ordinary temperature for 14 hours. After completion of the reaction, the reaction mixture was treated in the same manner as in the above Example 19. except recrystallization from ether, to give 6.2g. of the desired product melting at 92°–94°C.

EXAMPLE 24

5-Chloro-2-(2-mercaptoethylamino)acetylaminobenzophenone

A mixture of 5.2g. of 5-chloro-2-bromoacetylaminobenzophenone, 1.2 g. of 2-mercaptoethylamine, 1.8g. of triethylamine and 60ml. of dioxane was stirred at ordinary temperature for 4 hours. After completion of the reaction, the dioxane was distilled off under reduced pressure. The residue was extracted with dichloromethane. The extract was washed with water, dried over anhydrous sodium sulfate and the solvent was distilled off. The oily residue dissolved in a mixture of benzene with chloroform was chromatographed through a silica gel column. Pale yellow fractions of eluates were collected and the solvent was distilled off to give 4.1g. of the desired product.

Analysis: Calculated for $C_{17}H_{17}O_2N_2SCL$: C,58.54; H,4.88; N,8.04; Cl,10.18; S,9.18. Found: C,58.37; H,4.91; N,7.92; Cl,10.24; C,9.33.

EXAMPLE 25

3-Methyl-5-chloro-2-(2-hydroxy-n-propylamino)acetylaminobenzophenone

A mixture of 3.6g. of 3-methyl-5-chloro-2-bromoacetylaminobenzophenone, 1.6g. of isopropanolamine and 100ml. of dichloromethane was stirred at ordinary temperature for 10 hours. After completion of the reaction, the reaction mixture was washed with water, dried over anhydrous sodium sulfate and then the solvent was distilled off. The residue was recrystallized from ethanol to give 0.9g. of the desired product as crystals melting at 88°–91°C.

EXAMPLE 26

5-Nitro-2-(2-hydroxy-2-n-propylamino)acetylaminobenzophenone

A mixture of 7.3g. of 5-nitro-2bromoacetylaminobenzophenone, 1.6g. of isopropanolamine, 2.4g. of triethylamine and 80ml. of dioxane was sirred at ordinary temperature for 5hours. After completion of the reaction, the reaction mixture was treated in the same manner as in the above Example 19. except recrystallization from ether to give 6.2g. of the desired product melting at 106°–108.5°C.

EXAMPLE 27

3,5-Dimethyl-2-(2-hydroxy-2-n-propylamino)acetylaminobenzophenone

A mixture of 3.4g. of 3,5-dimethyl-2-bromoacetylaminobenzophenone, 1.8g. of isopropanolamine and 60ml. of dioxane was stirred at ordinary temperature for 4 hours. After completion of the reaction, the reaction mixture was treated in the same manner as in the above Example 20. to give 1.1g. of the desired product as pale yellow oil.

Analysis: Calculated for $C_{20}H_{24}O_3N_2$: C,70.56; H,7.11; N,8.23. Found: C,70.44; H,7.30; N,8.09.

EXAMPLE 28

5-Bromo-2-(2-hydroxy-n-propylamino)acetylaminobenzophenone

A mixture of 7.9g. of 5-bromo-2-bromoacetylaminobenzophenone, 3.3g. of isopropanolamine and 100ml. of dichloromethane was stirred at ordinary temperature for 12 hours. After completion of the reaction, the reaction mixture was washed with water, dried over anhydrous sodium sulfate and then the residue was recrystallized from ethanol to give 6.5g. of the desired product melting at 93°–96°C.

In the substantially same manner as set forth above, there were obtained the following benzophenone derivatives:

4,5-dichloro-2-(2-hydroxy-n-propylamino)acetylaminobenzophenone (m.p. 145.5°–147.5°C.)
  4,5-dimethyl-2-(2-hydroxy-n-propylamino)acetylaminobenzophenone (m.p.62°–65°C.);
  3,5-dichloro-2-(2-hydroxy-n-propylamino)acetylaminobenzophenone (m.p. 159°–164°C.);
  5-bromo-2-(2-hydroxyethylamino)acetylaminobenzophenone (m.p. 140°–141.5°C.);
  5-nitro-2-(2-hydroxyethylamino)acetylaminobenzophenone (m.p. 136°–137.5°C.);

5-chloro-2-(2-hydroxy-n-propylamino)acetylamino-p-chlorobenzophenone (m.p. 116°–118.5°C.);

5-chloro-2(2-hydroxy-n-propylamino)acetylamino-o-chlorobenzophenone (m.p. 108°–110°C., with decomposition);

5-chloro-2-(2-hydroxyethylamino)acetylamino-o-chlorobenzophenone (m.p. 107°–109°C., with decomposition)

5-nitro-2-(2-hydroxy-n-propylamino)acetylamino-o-chlorobenzophenone (m.p. 125°–127°C.);

5-nitro-2-(2-hydroxyethlamino)acetylamino-o-chlorobenzophenone (m.p. 129°–132°C.);

5-chloro-2-(2-hydroxy-n-propylamino)acetyl-p-nitrobenzophenone (m.p. 101°–103°C.);

5-chloro-2(2-hydroxy-n-propylamino)acetylamino-o-methylbenzophenone (m.p. 83°–86°C.);

5-chloro-2-(2-hydroxy-n-propylamino)acetylamino-o,p-dichlorobenzophenone (m.p. 113°–116°C.);

5-bromo-2-(2-hydroxyethylamino)acetylamino-o-chlorobenzophenone (m.p. 125°–127°C.); and 5-bromo-2-(2-hydroxy-n-propylamino)acetylamino-o-chlorobenzophenone (m.p. 93°–96°C.).

EXAMPLE 29

5-Chloro-2-(2-hydroxyethylamino)acetylaminobenzophenone

A mixture of 8.9g. of 5-chloro-2-tosyloxyacetylaminobenzophenone, 2.7g. of 2-aminoethanol and 100ml. of tetrahydrofuran was stirred at about 40°C. for 12 hours. After completion of the reaction, the solvent was distilled off and then the residue was extracted with dichloromethane. The extract was washed with water, dried over anhydrous sodium sulfate and then the solvent was distilled off. The residue was recrystallized from ethanol to give the desired product melting at 121°–122.5°C.

EXAMPLE 30

5-Chloro-2-(3-hydroxy-n-propylamino)acetylaminobenzophenone

A mixture of 3.1g. of 5-chloro-2-tosyloxyacetylaminobenzophenone, 1.2g. of 3-amino-n-propanol and 60ml. of tetrahydrofuran was stirred at 40°–50°C. for 14 hours. After completion of the reaction, the solvent was distilled off and the residue was extracted with dichloromethane. The extract was washed with water, dried over anhydrous sodium sulfate and then the solvent was distilled off. The residue dissolved in benzene was adsorbed on a silica gel column which was eluated successively with benzene and then with a mixture of benzene with ethyl acetate (9:1). The pale yellow fractions eluated with said mixture eluent were collected and the solvents were distilled off to give 1.9g. of the desired product as pale yellow oil.

Analysis: Calculated for $C_{18}H_{19}N_2O_3Cl$: C,62.36; H,5.52; N,8.12; Cl,10.22. Found: C,61.88; H,5.19; N,8.43; Cl,10.48

EXAMPLE 31

5-Chloro-2-(2-hydroxy-n-propylamino)acetylaminobenzophenone

A mixture of 6.6g. of 5-chloro-2-tosyloxyacetylaminobenzophenone, 2.5g. of isopropanolamine and 100ml. of tetrahydrofuran was stirred at 40°C. for 16 hours. After completion of the reaction, the reaction mixture was treated in the same manner as in the above Example 29 to give 4.6g. of the desired product melting at 92.5°–94°C.

Following the substantially same procedure as described in the foregoing, there were prepared the following benzophenone derivatives:

5-chloro-2-(2-hydroxy-1-methyl-1-hydroxymethylethylamino)-acetylaminobenzophenone (m.p. 120°–121°C.);

5-chloro-2-(2-hydroxy-1,1-dimethylethylamino)acetylaminobenzophenone (m.p. 112.5°–114°C.);

5-nitro-2-(2-hydroxy-n-propylamino)acetylaminobenzophenone (m.p. 106°–108°C.);

3,5-dimethyl-2-(2-hydroxy-n-propylamino)acetylaminobenzophenone (pale yellow oil, Analysis: Calculated for $C_{20}H_{24}N_2O_3$: C,70.56; H,7.11; N,8.23 Found: C,70.17; H,7.48; N,8.56);

5-bromo-2-(2-hydroxy-n-propylamino)acetylaminobenzophenone (m.p. 93°–95.5°C.);

4,5-dichloro-2(2-hydroxy-n-propylamino)acetylaminobenzophenone (m.p. 145°–147°C.);

4,5-dimethyl-2-(2-hydroxy-n-propylamino)acetylaminobenzophenone (m.p 62°–65°C.);

5-bromo-2-(2-hydroxyethylamino)acetylaminobenzophenone (m.p. 140°–142°C.);

5-nitro-2-(2-hydroxyethylamino)acetyaminobenzophenone (m.p. 135.5°–137°C.);

3,5-dichloro-2-(2-hydroxy-n-propylamino)acetylaminobenzophenone (m.p. 158.5°–163°C.);

3-methyl-5-chloro-2-(2-hydroxy-n-propylamino)acetylaminobenzophenone (m.p. 88.5.°–91°C.);

5-chloro-2-(2-hydroxy-n-propylamino)acetylmethylaminobenzophenone (pale yellow oil, Analysis: Calculated for $C_{19}H_{21}N_2O_3Cl$: C,63.30; H,5.87; N,7.77; Cl,10.17. Found: C,63.17; H,5.71; N,7.83; Cl,10.06;

5-chloro-2-(2-hydroxy-n-propylamino)acetylamino-p-chlorobenzophenone (m.p. 116°–118°C.);

5-chloro-2-(2-hydroxy-n-propylamino)acetylamino-o-chlorobenzophenone (m.p. 107.5°–110°C., withh decomposition);

5-chloro-2-(2-hydroxyethylamino)acetylamino-o-chlorobenzophenone (m.p. 107°–109°C. with decomposition);

5-chloro-2-α-(2-hydroxyethylamino)propionylamino-benzophenone (plate yellow oil, Analysis: Calculated for $C_{18}H_{19}N_2O_3Cl$: C,62.36; H,5.52; N,8.12; Cl,10.22 Found: C,62.29; H,5.38; N,8.27; Cl,10.26);

5-chloro-2-(2-hydroxy-n-propylamino)acetylamino-p-nitrobenzophenone (m.p. 101°–103°C.);

5-chloro-2-(2-hydroxy-n-propylamino)acetylamino-o-methylbenzophenone (m.p. 83.5°–86°C.);

5-chloro-2-(2-mercaptoethylamino)acetylaminobenzophenone (pale yellow oil,

Analysis: Calculated for $C_{17}H_{17}N_2O_2SCl$; C,58.45;

H,4.88; N,8.04; Cl,10.18,S,9.18. Found: C,58.29. H,4.83; N,8.15; Cl,10.31;S,9.05);
5-bromo-2-(2-hydroxyethylamino)acetylamino-o-chlorobenzophenone (m.p. 125°–127.5°C.); and
5-bromo-2-(2-hyroxy-n-proplamino)acetylamino-o-chlorobenzophenone (m.p. 92°–96°C.).

EXAMPLE 32

7-Chloro-5-phenyl-tetrahydrooxazolo[5.4-b]-2,3,4,5-tetrahydro-1H-1,4-benzodiazepin-2-one To a solution of 10g. of 5-chloro-2-(2-hydroxyethylamino)acetylaminobenzophenone in 80ml. of xylene was added two drops of acetic acid. The resulting mixture was heated under reflux for 12 hours. After completion of the reaction, the solvent was distilled off from the reaction mixture and then the residue was recrystallized from methanol to give 5.6g. of the desired product melting at 175°–176°C.

EXAMPLE 33.

7-Chloro-5-phenyl-5'-methyltetrahydrooxazolo[5.4-b]-2,3,4,5-tetrahydro-1H-1,4-benzodiazepin-2-one To a solution of 10g. of 5-chloro-2-(2-hydroxy-n-propylamino)acetylaminobenzophenone in 100ml. of ethanol was added several drops of acetic acid. The resulting mixture was heated under reflux for 16 hours. After completion of the reaction, the reaction mixture was concentrated to a small volume thereby separatng crystalline substance, which was then recovered by filtration to give 7.8g. of the desired product melting at 186°–188.5°C.

Following the substantially same procedure as described above, there were similarly prepared the following benzodiazepine derivatives:

7-chloro-5-phenyl-tetrahydro-2'H-1',3'-oxazino[5.4-b]-2,3,4,5-tetrahydro1H-1,4-benzoazepin-2-one (m.p. 220–223°C.);
7-nitro-5-phenyl-5'-methyltetrahydrooxazolo[5.4-b]-2,3,4,5-tetrahydro-1H-1,4-benzodiazepin-2-one (m.p. 209°C.);
7,9-dimethyl-5-phenyl-5'-methyltetrahydrooxazolo[5.4-b]-2,3,4,5-tetrahydro-1H-1,4-benzodiazepin-2-one (m.p.273°C.);
7-bromo-5-phenyl-5'-methyltetrahydrooxazolo[5.4-b]-2,3,4,5-tetrahydro-1H-1,4-benzodiazepin-2-one (m.p. 180°C.);
7-bromo-5-phenyl-tetrahydrooxazolo[5.4-b]-2,3,4,5-tetrahydro-1H-1,4-benzodiazepin-2-one (m.p. 190°–191°C.);
7-nitro-5-phenyl-tetrahydrooxazolo[5.4-b]-2,3,4,5-tetrahydro-1H-1,4-benzodiazepin-2-one (m.p. 218°–220°C.);
9-methyl-7-chloro-5-phenyl-5'-methyltetrahydrooxazolo-[5.4-b]-2,3,4,5-tetrahydro-1H-1,4-benzodiazepin-2-one (m.p. 254°C.);
7,8-dichloro-5-phenyl-5'-methyltetrahydrooxazolo[5.4-b]-2,3,4,5-tetrahydro-1H-1,4-benzodiazepin-2-one (m.p. 196°–197.5°C.);
7,8-dimethyl-5-phenyl-5'-methyltetrahydrooxazolo[5.4-b]-2,3,4,5-tetrahydro-1H-1,4-benzodiazepin-2-one (m.p. 172°–174°C.);
7-chloro-5-(4-chlorophenyl)-5'-methyltetrahydrooxazolo-[5.4-b]-2,3,4,5-tetrahydro-1H-1,4-benzodiazepin-2-one (m.p. 187.5°–189°C.);
7,9-dichloro-5-phenyl-5'-methyltetrahydrooxazolo[5.4-b]-2,3,4,5-tetrahydro-1H-1,4-benzodiazepin-2-one (m.p. 226°–228°C.);
7-chloro-5-(4-nitrophenyl)-5'-methyltetrahydrooxazolo-[5.4-b]-2,3,4,5-tetrahydro-1H-1,4-benzodiazepin-2-one (m.p. 193°–195°C.);
7-chloro-5-(2,4-dichlorophenyl)-5'-methyltetrahydrooxazolo[5.4-b]-2,3,4,5-tetrahydro-1H-1,4-benzodiazepin-2-one (m.p. 201.5°C., with decomposition);
7-choloro-5-(2-methylphenyl)-5'-methyltetrahydrooxazolo-[5.4-b]-2,3,4,5-tetrahydro-1H-1,4-benzodiazepin-2-one (m.p. 205°C., with decomposition);
7-chloro-5-(2-chlorophenyl)-5'-methyltetrahydrooxazolo-[5.4-b]-2,3,4,5-tetrahydro-1H-1,4-benzodiazepin-2-one (m.p. 192°C., with decomposition);
7-chloro-5-(2-chlorophenyl)-tetrahydrooxazolo[5.4-b]-2,3,4,5-tetrahydro-1H-1,4-benzodiazepin-2-one (m.p. 204°C. with decomposition);
7-chloro-5-(2-fluorophenyl)-5'-methyltetrahydrooxazolo-[5.4-b]-2,3,4,5-tetrahydro-1H-1,4-benzodiazepin-2-one (m.p. 199°C., with decomposition);
7-chloro-5-(2-fluorophenyl)-tetrahydrooxazolo[5.4-b]-2,3,4,5-tetrahydro-1H-1,4-benzodiazepin-2-one (m.p. 181°–183°C.);
7-nitro-5-(2-chlorophenyl)-tetrahydrooxazolo[5.4-b]-2,3,4,5-tetrahydro-1H-1,4-benzodiazepin-2-one (m.p. 230°–235°C., with decomposition); and
7-nitro-5-(2-chlorophenyl)-5'-methyltetrahydrooxazolo-[5.4-b]-2,3,4,5-tetrahydro-1H-1,4-benzodiazepin-2-one (m.p. 223°–226°C., with decomposition).

EXAMPLE 34

7-Chloro-5-phenyl-tetrahydrothiazolo[5.4-b]-2,3,4,5-tetrahydro-1H-1,4-benzodiazepin-2-one A solution of 5g. of 5-chloro-2-(2-mercaptoethylamino)acetylaminobenzophenone in 70ml. of xylene was heated under relux for 18 hours. After completion of the reaction, the xylene was distilled off and then the residue was dissolved in chloroform. The chloroform solution was decolored by passing it through a short colum of active alumina and then the chloroform was distilled off. The residue was recrystallized from ethanol to give 1.4g. of the desired product melting at 241°–243°C.

EXAMPLE 35

7-Chloro-5-phenyl-tetrahydrooxazolo[5.4-b]-2,3,4,5-tetrahydro-1H-1,4-benzodiazepin-2-one To a solution of 10g. of 5-chloro-2-(2-hydroxyethylamino)-acetylaminobenzopenone in 80ml. of xylene was added two drops of acetic acid. The resulting mixture was stirred at room temperature for 100 hours. After completion of the reaction, the solvent was distilled off under reduced pressure and the residue was recrystallized from methanol to give the desired product melting at 175°–176°C.

EXAMPLE 36

7-Chloro-5-phenyl-5'-methyltetrahydrooxazolo[5.4-b]-2,3,4,5-tetrahydro-1H-1,4-benzodiazepin-2-one To a solution of 10g. of 5-chloro-2-(2-hydroxy-n-propylamino)acetylaminobenzophenone in 100ml. of ethanol was added several drops of acetic acid. The resulting mixture was stirred at room temperature for 160 hours. After completion of the reaction, the reaction mixture was concentrated to a small volume and the concentrate was allowed to stand at ambient temperature thereby separating crystalline substance, which was then recovered by filtration to give the desired product melting at 186°–188.5°C.

Following the substantially same procedure as described above, there were similarly obtained the following benzodiazepine derivatives:

7-chloro-5-phenyl-tetrahydro-2'H-1',3'-oxazino[5.4-b]-2,3,4,5-tetrahydro-1H-1,4-benzodiazepin-2-one (m.p. 220°–223°C.);

7-nitro-5-phenyl-5'-methyltetrahydrooxazolo[5.4-b]-2,3,4,5-tetrahydro-1H-1,4-benzodiazepin-2-one (m.p. 209°C);

7,9-dimethyl-5-phenyl-5'-methyltetrahydrooxazolo[5.4-b]-2,3,4,5-tetrahydro-1H-1,4-benzodiazepin-2-one (m.p.273°C.);

5-bromo-5-phenyl-5'-methyltetrahydrooxazolo[5.4-b]-2,3,4,5-tetrahydro-1H-1,4-benzodiazepin-2-one (m.p. 180°–183.5°C.);

7-bromo-5-phenyl-tetrahydrooxazolo[5.4-b]-2,3,4,5-tetrahydro-1H-1,4-benzodiazepin-2-one (m.p. 190° - 191.5°C.);

7-nitro-5-phenyl-tetrahydrooxazolo[5.4-b]-2,3,4,5-tetrahydro-1H-1,4-benzodiazepin-2-one (m.p. 218° - 220°C.);

9-methyl-7-chloro-5-phenyl-5'-methyltetrahydrooxazolo [5.4-b]-2,3,4,5-tetrahydro-1H-1,4-benzodiazepin-2-one (m.p. 254°C.);

7,8-dichloro-5-phenyl-5'-methyltetrahydrooxazolo[5.4-b]-2,3,4,5-tetrahydro-1H-1,4-benzodiazepin-2-one (m.p. 196° - 197.5°C.);

7,8-dimethyl-5-phenyl-5'-methyltetrahydrooxazolo[5.4-b]-2,3,4,5-tetrahydro-1H-1,4-benzodiazepin-2-one (m.p. 172°–174°C.);

7-chloro-5-(4-chlorophenyl)-5'-methyltetrahydrooxazolo-[5.4-b]-2,3,4,5-tetrahydro-1H-1,4-benzodiazepin-2-one (m.p. 187.5° - 189°C.);

7,9-dichloro-5-phenyl-5'-methyltetrahydrooxazolo[5.4-b]-2,3,4,5-tetrahydro-1H-1,4-benzodiazepin-2-one (m.p. 226° - 228°C.);

7-chloro-5-(4-nitrophenyl)-5'-methyltetrahydrooxazolo-[5.4-b]-2,3,4,5-tetrahydro-1H-1,4-benzodiazepin-2-one (m.p. 193° - 195°C.);

7-chloro-5-(2,4-dichlorophenyl)-5'-methyltetrahydrooxazolo[5.4-b]-2,3,4,5-tetrahydro-1H-1,4-benzodiazepin-2-one (m.p. 201.5°C., with decomposition);

7-chloro-5-(2-methylphenyl)-5'-methyltetrahydrooxazolo-[5.4-b]-2,3,4,5-tetrahydro-1H-1,4-benzodiazepin-2-one (m.p. 205°C. with decomposition);

7-chloro-5-(2-chlorophenyl)-5'-methyltetrahydrooxazolo-[5.4-b]-,2,4,5-tetrahydro-1H-1,4-benzodiazepin-2-one (m.p. 192°C. with decomposition);

7-chloro-5-(2-chlorophenyl)-tetrahydrooxazolo[5.4-b]-2,3,4,5-tetrahydro-1H-1,4-benzodiazepin-2-one (m.p. 204°C. with decomposition);

7-chloro-5-(2-fluorophenyl)-5'-methyltetrahydrooxazolo-[5.4-b]- 2,3,4,5-tetrahydro-1H-1,4-benzodiazepin-2-one (m.p. 199°C. with decompositon);

7-chloro-5-(2-fluorophenyl)-tetrahydrooxazolo[5.4-b]-2,3,4,5-tetrahydro-1H-1,4-benzodiazepin-2-one (m.p. 181°–183°C. with decomposition);

7-nitro-5-(2-chlorophenyl)-tetrahydrooxazolo[5.4-b]-2,3,4,5-tetrahydro-1H-1,4-benzodiazepin-2-one (m.p. 230°–235°C. with decomposition); and 7-nitro-5-(2-chlorophenyl)-5'-methyltetrahydrooxazolo [5.4-b]-2,3,4,5-tetrahydro-1H-1,4-benzodiazepin-2-one (m.p. 223°–226°C. with decomposition).

EXAMPLE 37

7-Chloro-5-phenyl-tetrahydrothiazolo[5.4-b]-2,3,4,5-tetrahydro-1H-1,4-benzodiazepin-2-one A solution of 5g. of 5-chloro-2-(2-mercaptoethylamino) acetylaminobenzophenone in 70ml. of xylene was stirred at room temperature for 170 hours. After completion of the reaction, the xylene was distilled off. The residue dissolved in chloroform was decolored by passing it through a short column of active alumina and then the chloroform was distilled off. The residue was recrystallized from ethanol to give the desired product melting at 241°–243°C.

EXAMPLE 38

7-Chloro-3-methyl-5-phenyl-5'-methyltetrahydrooxazolo [5.4-b]-2,3,4,5-tetrahydro-1H-1,4-benzoazepin-2-one To a solution of 6.3g. of 5-chloro-2-α-(2-hydroxy-n-propylamino)propionylaminobenzophenone in 200ml. of ethanol was added two drops of acetic acid. The resulting mixture was heated under reflux for 16 hours. After completion of the reaction, the reaction mixture was concentrated to a small volume and the concentrate was allowed to cool, whereupon crystalline substance was separated in situ and the recovered by filtration to give 3.52g. of the desired product melting at 216°–217°C.

Following the substantially same procedure as described above, there were similarly prepared the following benzodiazepine derivatives:

7-chloro-3-methyl-5-phenyl-tetrahydrooxazolo[5.4-b]-2,3,4,5-tetrahydro-1H-1,4-benzodiazepin-2-one (m.p. 204.5°–207°C.);

7-bromo-3-methyl-5-phenyl-tetrahydrooxazolo[5.4-b]-2,3,4,5-tetrahydro-1H-1,4-benzodiazepin-2-one (m.p. 198.5°–201°C.);

3,7,9-trimethyl-5-phenyl-tetrahydrooxazolo[5.4-b]-2,3,-4,5-tetrahydro-1H-1,4-benzodiazepin-2-one (m.p. 218°–221°C.);

7-chloro-3-n-propyl-5-phenyl-5'-methyltetrahydrooxazolo-[5.4-b]- 2,3,4,5-tetrahydro-1H-1,4-benzodiazepin-2-one (m.p. 178°–181.5°C.);

7-chloro-3-n-butyl-5-phenyl-tetrahydrooxazolo[5.4-b]-2,3,4,5-tetrahydro-1H-1,4-benzodiazepin-2-one (m.p. 173°–175°C.);

3,7,9-trimethyl-5-(4-chlorophenyl)-tetrahydrooxazolo-[5.4-b]-2,3,4,5-tetrahydro-1H-1,4-benzodiazepin-2-one (m.p. 218°–222°C. with decomposition);

7-bromo-3-ethyl-5-(2-chlorophenyl)-tetrahydrooxazolo-[5.4-b]-2,3,4,5-tetrahydro-1H-1,4-benzodiazepin-2-one (m.p. 188°–191°C.);

7-chloro-3-methyl-5-(2-methylphenyl)-tetrahydrooxazolo-[5.4-b]-2,3,4,5-tetrahydro-1H-1,4-benzodiazepin-2-one (m.p. 213°–217°C.);

7-chloro-3-methyl-5-(4-nitrophenyl)-tetrahydrooxazolo-[5.4-b]-2,3,4,5-tetrahydro-1H-1,4-benzodiazepin-2-one (m.p. 203°–206°C. with decomposition); and 7-chloro-3-methyl-5-(4-chlorophenyl)-tetrahydrooxazolo-[5.4-b]-2,3,4,5-tetrahydro-1H-1,4-benzodiazepin-2-one (m.p. 204°–206°C.).

EXAMPLE 39

7-Nitro-3-methyl-5-phenyl-tetrahydrooxazolo[5.4-b]-2,3,-4,5-tetrahydro-1H-1,4-benzodiazepin-2-one To a solution of 5.6g. of 5-nitro-2-α-(2-hydroxyethylamino)propionylaminobenzophenone in 200ml. of ethanol were added two drops of acetic acid and 30ml. of benzene. The resulting mixture was heated under reflux for 18 hours, during which period of time the solvent was being distilled off in small portions and in turn a fresh mixture of benzene and ethanol was being added dropwise in small portions into the reaction mixture. At the end of this time, the solvent was distilled off and then the residue dissolved in benzene was adsorbed on a silica gel column. After elution with benzene of said column, elution was done with a mixture of benzene and ethyl acetate. Those fractions with said mixtures were collected and the solvent was distilled off. The residue was recrystallized from ethanol to give 1.52g. of the desired product melting at 220°–224.5°C.

Following the substantially same procedure as described above, there were similarly prepared the following benzodiazepine derivatives:

7-chloro-3-methyl-5-phenyl-tetrahydro-2'H-1',3'-oxazino-[5.4-b]-2,3,4,5-tetrahydro-1H-1,4-benzodiazepin-2-one (m.p. 172°–175°C.);

7-chloro-3,3-dimethyl-5-phenyl-tetrahydrooxazolo[5.4-b]-benzodiazepin-2-one (m.p. 151°–154°C.);

7-chloro-3-methyl-5-phenyltetrahydrothaizolo[5.4-b]-2,3,4,5-tetrahydro-1H-1,4-benzodiazepin-2-one (m.p. 205°–207°C.) and 7-chloro-3,9-dimethyl-tetrahydrothiazolo[5.4-b]-2,3,4,5-tetrahydro-1H-1,4-benzodiazepin-2-one (m.p. 253°–256°C. with decomposition).

EXAMPLE 40

7-Chloro-3-ethyl-5-phenyl-tetrahydrooxazolo[5.4-b]-2,3,4,5-tetrahydro-1H-1,4-benzodiazepin-2-one To a solution of 2.7g. of 5-chloro-2-α-(2-hydroxyethylamino)-n-butyrylaminobenzophenone in 100ml. of ethanol was added two drops of acetic acid. The resulting mixture was heated under reflux for 16 hours. After completion of the reaction, the solvent was distilled off from the reaction mixture and the residue was dissolved in dichloromethane. The dichloromethane solution was washed successively with a dilute aqueous sodium bicarbonate solution and water, dried over anhydrous sodium sulfate and then the solvent was distilled off. The residue was recrystallized from ethanol to give 1.18g. of the desired product melting at 183°–184.5°C.

Following the substantially same procedure as described above, there was prepared 7-chloro-3-ethyl-5-phenyl-5'-methyltetrahydrooxazolo[5.4-b]-2,3,4,5-tetrahydro-1H-1,4-benzodiazepin-2-one (m.p. 191.5°–193°C.).

EXAMPLE 41

7-Chloro-9-methyl-3-ethyl-5-phenyl-5'-methyltetrahydrooxazolo[5.5-b]-2,3,4,5-tetrahydro-1H-1,4-benzodiazepin-2-one To a solution of 3.1g. of 3-methyl-5-chloro-2-α-(2-hydroxy-n-propylamino)-n-butyrylaminobenzophenone in 150ml. of ethanol was added two drops of acetic acid. The resulting mixture was heated under reflux for 18 hours. After completion of the reaction, the solvent was distilled off and the residue was dissolved in dichloromethane. The solution was washed with water, dried over anhydrous sodium sulfate and then the solvent was distilled off. The residue was recrystallized from ethanol to give 1.16g. of the desired product melting at 231°–235°C.

Following the substantially same procedure as described above, there was prepared 7-bromo-3,3-dimethyl-5-(4-methylphenyl)-5'-methyltetrahydrooxazolo[5.4-b]-2,3,4,5-tetrahydro-1H-1,4-benzodiazepin-2-one, melting at 182°–184°C.

EXAMPLE 42

7-Chloro-1-methyl-5-phenyl-tetrahydrooxazolo[5.4-b]-2,3,4,5-tetrahydro-1H-1,4-benzodiazepin-2-one To a suspension of 6.3g. of 7-chloro-5-phenyl-tetrahydroozazolo[5.4-b]-2,3,4,5--tetrahydro-1H-1,4-benzodiazepin-2-one in 30ml. of methanol was added 1.2g. of sodium methoxide, thereby to form the corresponding sodium salt in situ. After removal of the solvent by distillation, the residual sodium salt was stirred at room temperature for 6 hours together with 20ml. of dimethylformamide and 3.6g. of methyl iodide. The solvent was distilled off under reduced pressure and then dichloromethane and water were added to the residue. The resulting mixture was throughly shaken and then the organic layer was separated, dried over anhydrous sodium sulfate and finally the solvent was distilled off. The residue was recrystallized from ethanol to give 5.4g. of the desired product as crystals melting at 180.5°–183°C

EXAMPLE 43

7-Chloro-1-methyl-5-phenyl-5'-methyltetrahydrooxazolo[5.4-b]-2,3,4,5-tetrahydro-1H-1,4-benzodiazepin-2-one To a suspension of 6.5g. of 7-chloro-5-phenyl-5'-methyltetrahydrooxazolo[5.4-b]-2,3,4,5-tetrahydro-1H-1,4-benzodiazepin-2-one in 30ml. of methanol was added 1.2g. of sodium methoxide, thereby to form the corresponding sodium salt in situ. After removal of the solvent by distillation, the residual sodium salt was heated under reflux for 6 hours together with 20ml. of dimethylformamide and 3.5g. of dimethylsulfate. The

EXAMPLE 44

1,7,9-Trimethyl-5-phenyl-5'-methyl-tetrahydrooxazolo[5.4-b]-2,3,4,5-tetrahydro-1H-1,4-benzodiazepin-2-one From 6.4g. of 7,9-dimethyl-5-phenyl-5'-methyl-tetrahydrooxazolo 5.4-b -2,3,4,5-tetrahydro-1H-1,4-benzodiazepin-2-one, 30ml. of methanol and 1.2g. of sodium methoxide was prepared the corresponding sodium salt as in the above Example 42. To a solution of the sodium salt in 30ml. of dimethylformamide was added 3.6g. of dimethyl sulfate and the resulting mixture was heated under reflux for 8 hours. The reaction mixture was treated in the same manner as in the above Example 43 to give 4.2g. of the desired product as crystals melting at 135.5°–138°C.

EXAMPLE 45

7-Chloro-1,9-dimethyl-5-phenyl-5'-methyltetrahydrooxazolo-[5.4-b]-2,3,4,5-tetrahydro-1H-1,4-benzodiazepin-2-one From 3.4g. of 7-chloro-9-methyl-5-phenyl-5'-methyltetrahydrooxazolo[5.4-b]-2,3,4,5-tetrahydro-1H-1,4-benzodiazepin-2-one, 20ml. of methanol and 0.6g. of sodium methoxide was prepared the corresponding sodium salt as in the above Example 42. The corresponding sodium salt was stirred at room temperature for 10 hours together with 20ml. of dimethylformamide and 2.0g. of methyl iodide. The reaction mixture was treated in the same manner as in the above Example 42 to give 2.4g. of the desired product as crystals melting at 161.5°–163°C.

EXAMPLE 46

7-Chloro-1-ethyl-5-phenyl-5'-methyltetrahydrooxazolo[5.4-b]-2,3,4,5-tetrahydro-1H-1,4-benzodiazepin-2-one The sodium salt of 7-chloro-5-phenyl-5'-methyltetrahydrooxazolo[5.4-b]-2,3,4,5-tetrahydro-1H-1,4-benzodiazepin-2-one prepared from 6.5g. of the corresponding free base, 30ml. of methanol and 1.2g. of sodium methoxide as in the above Example 42 was stirred at room temperature for 12 hours together with 30ml. of dimethylformamide and 4.2g. of ethyl iodide. The reaction mixture was treated in the same manner as in the above Example 42 to give 6.1g. of the desired product melting at 157°–160°C.

EXAMPLE 47

7-Chloro-1-benzyl-5-phenyl-5'-methyltetrahydrooxazolo-[5.4-b]-2,3,4,5-tetrahydro-1H-1,4-benzodiazepin-2-one The sodium salt of 7-chloro-5-phenyl-5'-methyltetrahydrooxazole[5.4-b]-2,3,4,5-tetrahydro-1H-1,4-benzodiazepin-2-one prepared from 3.2g. of the corresponding free base, 20ml. of methanol and 0.6g. of sodium methoxide as in the above Example 42 was heated under reflux for 6 hours together with 20ml. of dimethylformamide and 20g. of benzyl bromide. The reaction mixture was treated in the same manner as in the above Example 42 to give 3.1g. of the desired product melting at 154°–157°C.

EXAMPLE 48

7-Chloro-1-methyl-5-(4-chlorophenyl)-5'-methyl-tetrahydrooxazolo[5.4-b]-2,3,4,5-tetrahydro-1H-1,4-benzodiazepin-2-one The sodium salt of 7-chloro-5-(4-chlorophenyl-5'-methyltetrahydrooxazolo[5.4-b]-2,3,4,5-tetrahydro-1H-1,4-benzodiazepin-2-one prepared from 1.8g. of the corresponding free base, 20ml. of methanol and 0.3g. of sodium methoxide as in the above Example 42 was stirred at room temperature for 16 hours together with 20ml. of dimethylformamide and 2.0g. of methyl iodide. The reaction mixture was treated in the same manner as in the above Example 42 to give 1.5g. of the desired product melting at 164°–167°C.

EXAMPLE 49

7-Bromo-1-methyl-5-phenyl-tetrahydrooxazolo[5.4-b]-2,3,4,5-tetrahydro-1H-1,4-benzodiazepin-2-one The sodium salt of 7-bromo-5-phenyl-tetrahydrooxazolo-[5.4-b]-2,3,4,5-tetrahydro-1H-1,4-benzodiazepin-2-one perpared from 7.2g. of the corresponding free base, 40ml. of methanol and 1.3g. of sodium methoxide was stirred at room temperature for 14 hours together with 40ml. of dimethylformamide and 3.9g. of methyl iodide. The reaction mixture was treated in the same manner as in the above Example 42 to give 4.8g. of the desired product melting at 179°–182°C.

Similarly, the following benzodiazepine derivatives were prepared from appropriate starting materials according to the procedures of the foregoing;

7-chloro-1-methyl-5-phenyl-tetrahydro-2'H-1',3'-oxazino [5.4-b]-2,3,4,5,-tetrahydro-1H-1,4-benzodiazepin-2-one (m.p. 172°–175°C.);

7-chloro-1-methyl-5-phenyl-tetrahydrothiazolo[5.4-b]-2,3,4,5-tetrahydro-1H-1,4-benzodiazepin-2-one (m.p. 218°–219°C.);

1,7,8-trimethyl-5-phenyl-5'-methyltetrahydrooxazolo-[5.4-b]-2,3,4,5-tetrahydro-1H-1,4-benzodiazepin-2-one (m.p. 124°–127.5°C.);

7,8-dichloro-1-methyl-5-phenyl-5'-methyltetrahydrooxazolo[5.4-b]-2,3,4,5-tetrahydro-1H-1,4-benzodiazepin-2-one (m.p. 158°–162.5°C.);

7-chloro-1-methyl-5-(4-nitrophenyl)-5'-methyltetrahydrooxazolo[5.4-b]-2,3,4,5-tetrahydro-1H-1,4-benzodiazepin-2-one (m.p. 149°–153°C.);

7-nitro-1-methyl-5-phenyl-5'-methyltetrahydrooxazolo [5.4-b]-2,3,4,5-tetrahydro-1H-1,4-benzodiazepin-2-one (m.p. 156.5°–159°C.);

7-chloro-1-n-butyl-5-phenyl-5'-methyltetrahydrooxazolo-[5.4-b]-2,3,4,5-tetrahydro-1H-1,4-benzodiazepin-2-one (m.p. 121°–122°C.); and 7-chloro-1-phenacyl-5-phenyl-5'-methyltetrahydrooxazolo-[5.4-b]-2,3,4,5-tetrahydro-1H-1,4-benzodiazepin-2-one (m.p. 175°–176°C.)

What is claimed is:

1. A process for the preparation of a compound having the formula

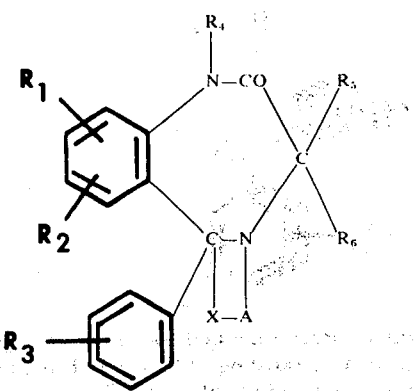

(I)

wherein
- $R_1$, $R_2$ and $R_3$ may be the same or different and each represents hydrogen, lower alkyl, lower alkoxy, halogen, hydroxy, nitro, cyano, lower alkanoyl, benzoyl, toluoyl, naphthoyl, trifluoromethyl, amino, lower alkanoyl amino, benzoylamino, toluoylamino, naphthoylamino, N-mono (lower alkyl) amino, N-di (lower alkyl) amino, lower alkanoyloxy benzoyloxy, carboxyl, lower alkoxycarbonyl, carbamoyl, N-mono (lower alkyl) carbamoyl, N-di (lower alkyl) carbamoyl, lower alkylthio, lower alkylsulfinyl or lower alkylsulfonyl;
- $R_4$ represents hydrogen, lower alkyl, cycloalkyl having from 3 to 6 carbon atoms, phenyl lower alkyl, phenyl, naphthyl, or phenacyl;
- $R_5$ and $R_6$ may be the same or different and each represents hydrogen, lower alkyl;
- A represents polymethylene having from 2 to 4 methylene groups which may be substituted with lower alkyl, hydroxy-substituted lower alkyl or phenyl; and
- X represents oxygen atom or sulfur atom which comprises reacting a compound having the formula

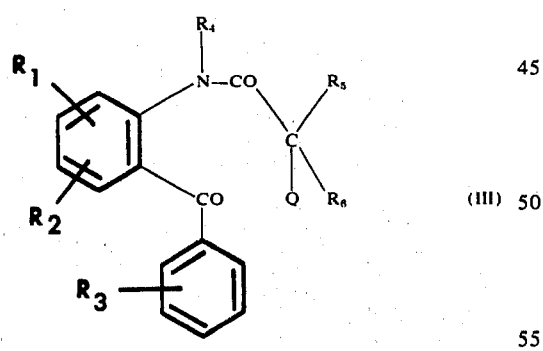

(III)

wherein $R_1$, $R_2$, $R_3$, $R_4$, $R_5$ and $R_6$ are as defined above and 0 is an acid radical of a hydrohalic acid ester, sulfonic acid ester or phosphoric acid ester, with a compound having the formula $$H_2N - A - X - H \qquad (IV)$$

wherein A and X are as defined above.

2. A process for the preparation of a compound having the formula wherein
- $R_1$, $R_2$ and $R_3$ may be the same or different and each represents hydrogen, lower alkyl, lower alkoxy, halogen, hydroxy, nitro, cyano, lower alkanoyl, benzoyl, toluoyl, naphthoyl, trifluoromethyl, amino, lower alkanoylamino, benzoylamino, toluoylamino, naphthoylamino, N-mono (lower alkyl) amino, N-di (lower alkyl) amino, lower alkoyloxy, benzoyloxy, carboxyl, lower alkoxycarbonyl, carbamoyl, N-mono (lower alkyl) carbamoyl, N-di (lower alkyl) carbamoyl, lower alkylthio, lower alkylsulfinyl or lower alkylsulfonyl;
- $R_4'$ represents lower alkyl, cycloalkyl having from 3 to 6 carbon atoms, phenyl lower alkyl, phenyl, naphthyl or phenacyl;
- $R_5$ and $R_6$ may be the same or different and each represents hydrogen or lower alkyl;
- A represents polymethylene having from 2 to 4 methylene groups which may be substituted with lower alkyl, hydroxy-substituted lower alkyl or phenyl; and
- X represents oxygen atom or sulfur atom which comprises reacting an alkali or alkaline earth metal salt of a compound having the formula

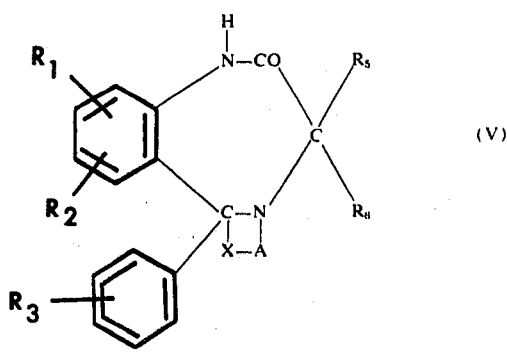

(V)

wherein $R_1$, $R_2$, $R_3$, $R_5$, $R_6$, A and X are as defined above with a compound having the formula

$$R_4' - Y \qquad (VI)$$

wherein $R_4'$ is as defined above and Y is halogen atom or the group $- SO_4 - R_4'$ in which $R_4'$ is as defined above.

3. A process for preparing a compound of the formula

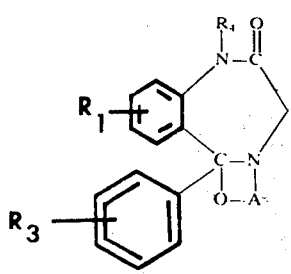

wherein $R_1$ is selected from the group consisting of hydrogen, halogen, nitro, trifluoromethyl, lower alkyl, lower alkoxy and lower alkyl thio, $R_3$ is selected from the group consisting of hydrogen, halogen, nitro, trifluoromethyl and lower alkyl, $R_4$ and $R_5$ are selected from the group consisting of hydrogen and lower alkyl, A is an ethylene or propylene group, either of which may be substituted with a lower alkyl group, which comprises reacting a compound of the formula

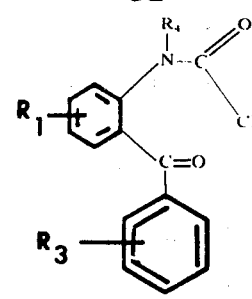

wherein $R_1$, $R_3$ and $R_4$ are as defined above and Q is selected from the group consisting of chlorine, bromine and iodine, with a compound of the formula $$H_2N—A—OH$$

wherein A is as defined above, in the presence of a base.

* * * * *